United States Patent [19]

Hooley et al.

[11] Patent Number: 4,723,118
[45] Date of Patent: Feb. 2, 1988

[54] MAGNETIC DETECTION SYSTEM FOR ITEMS ON THE LOWER TRAY OF A SHOPPING CART

[75] Inventors: Charles M. Hooley, Stillwater, Minn.; Patrick J. Utecht, Satellite Beach, Fla.

[73] Assignee: Retail Security Systems, Stillwater, Minn.

[21] Appl. No.: 907,521

[22] Filed: Sep. 15, 1986

Related U.S. Application Data

[63] Continuation-in-part of Ser. No. 645,056, Aug. 28, 1984.

[51] Int. Cl.4 .............................................. G08B 13/14
[52] U.S. Cl. ..................................... 340/568; 186/62
[58] Field of Search .................. 340/568, 666; 186/62; 280/33.99 C

[56] References Cited

U.S. PATENT DOCUMENTS

| | | | |
|---|---|---|---|
| 3,263,774 | 8/1966 | Reese | 186/62 |
| 3,778,808 | 12/1973 | Stevens | 340/666 |
| 4,327,819 | 5/1982 | Coutta | 186/62 |

Primary Examiner—James L. Rowland
Assistant Examiner—Jeffery A. Hofsass
Attorney, Agent, or Firm—Moore & Hansen

[57] ABSTRACT

A detection system for use by a checkout clerk in a checkout line to detect a load left on the lower tray of a shopping cart by the customer. The shopping cart has a lower tray pivotably mounted on a frame. The tray is movable between a first and second position when a load is placed on the tray. A field producing source such as a permanent magnet contained within a shield material is attached to the cart, and the field is actuated at a distance when the tray is moved from the first to the second position by displacing the magnet and the shield material. A detector for detecting the presence of that field as the shopping cart passes through the checkout line is coupled to a control circuit capable of signaling the checkout clerk that the load is on the lower tray.

11 Claims, 14 Drawing Figures

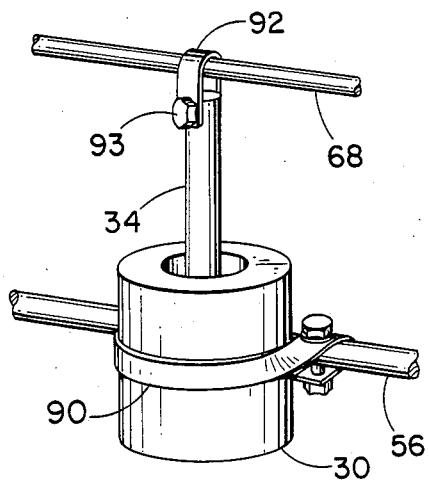
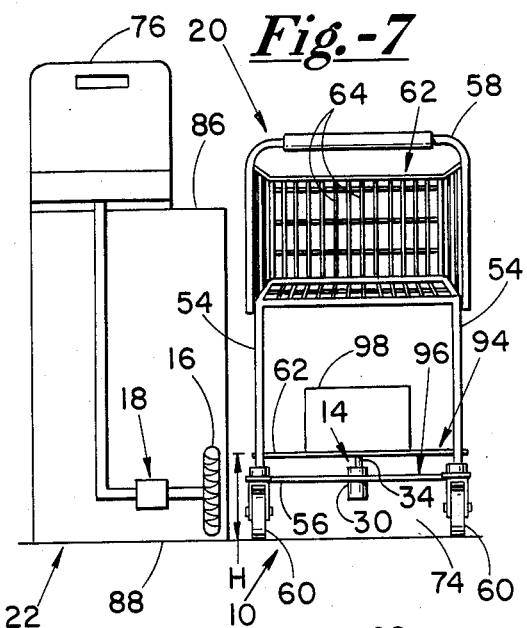
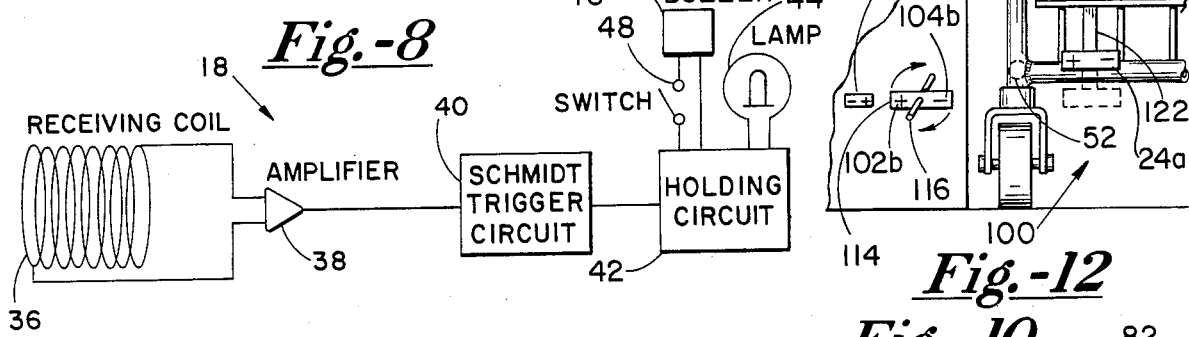
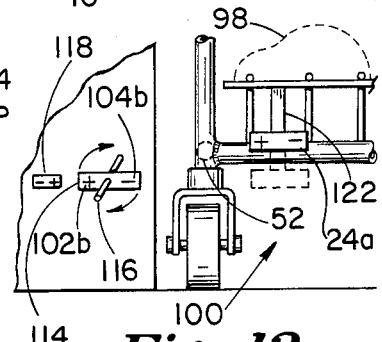
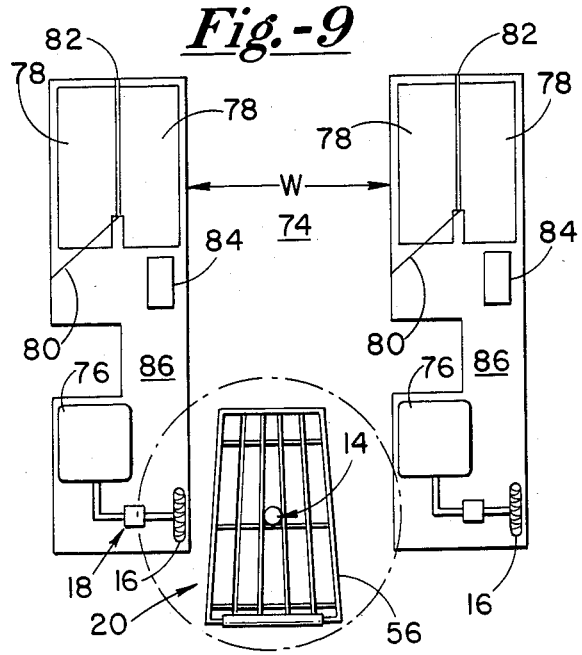
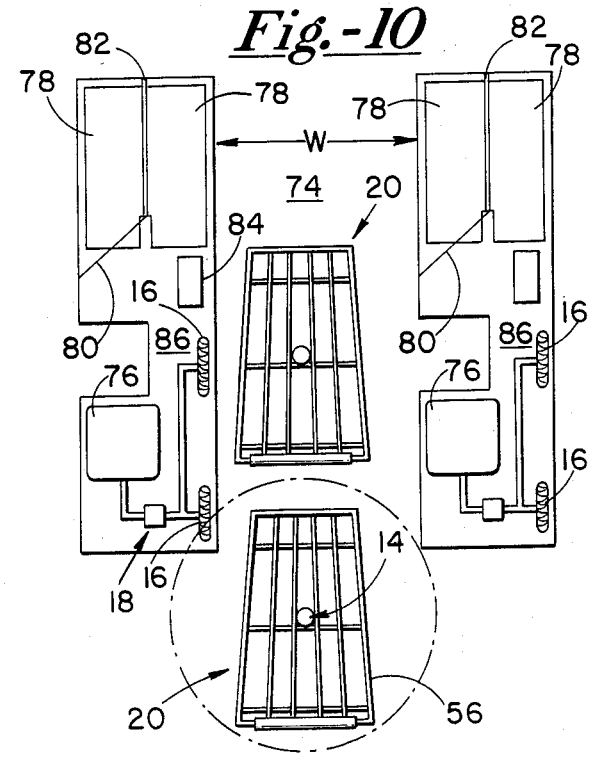

MAGNETIC DETECTION SYSTEM FOR ITEMS ON THE LOWER TRAY OF A SHOPPING CART

This application is a continuation-in-part of parent application Ser. No. 06/645,056 filed Aug. 28, 1984, entitled "Shopping Cart with Lower Tray Signaling Device."

BACKGROUND OF THE INVENTION

This invention relates to the field of shopping carts, and more specifically to a system for detecting a load placed on the lower tray of a shopping cart and signaling a checkout clerk of its presence.

Individuals operating supermarkets and shopping centers have long been faced with the problem of customers mistakenly or intentionally leaving items on the lower tray of their shopping carts, obscured from the view of a checkout clerk by the checkout counter. Many items are removed from stores in this manner without being paid for, and the resulting monetary losses are quite significant.

Consequently, several systems have been devised to signal a checkout clerk of the presence of a parcel on the lower tray of a shopping cart as that cart is wheeled through the checkout line.

U.S. Pat. No. 3,051,936 discloses an alarm system for shopping carts wherein a load placed on the lower tray of a shopping cart completes an electrical circuit running from a voltage source to a conductive portion of the floor on which the shopping cart is rolled, in turn to the shopping cart and back from the shopping cart to a second conductive portion of the floor insulated from the first conductive portion, to a signaling device and finally back to the voltage source. This system is very complex, and requires adaptation of the shopping carts and the floor passing through the checkout line. These modifications are both time consuming and expensive, and limit later renovation or reorganization of the store. Because the system must detect the very low currents required to prevent injury to customers, and must itself have a relatively low resistance, false alarms created by wet shoes or metallic objects are a continuing problem. Finally, the system is subject to frequent failure due to loss of electrical contact between the cart and the conductive portions of the floor caused by the buildup of dirt, waxes, or other substances.

U.S. Pat. No. 3,263,774 discloses a control apparatus which forces a checkout clerk to lean over the counter to depress a switch before operating the cash register, and in so doing necessarily place themself in a position to observe the lower tray of the shopping cart, which is illuminated by a light when that switch is depressed. This system is very inconvenient for the operator, and represents more of a nuisance to the checkout clerk than an aid to efficiently checking a customer's purchases.

U.S. Pat. No. 3,457,423 discloses a radiation sensitive detection system for shopping carts using an array of light beams and photoelectric cells connected to a logic circuit which discriminates between a shopping cart, a load on the lower tray of the shopping cart, and the legs of the customer as they pass through the checkout line. To be effective, the array of light beams and electric eyes must be carefully aligned, and while relatively expensive and complicated to install, this system is still prone to failure and false signals for several reasons: customers often move back and forth in line when placing items on the checkout counter or reaching for a product displayed near the checkout counter, more than one person or a person with small children may pass through the checkout line at one time, or a person may go through the line without a shopping cart. Furthermore, in this system a different array of light beams must be arranged for each type of shopping cart used and the appropriate logic circuit designed for that array—tasks which are too complex and impractical for field installers to perform.

U.S. Pat. No. 4,327,819 discloses an object detection system for a shopping cart having a reflector mounted on a spring-loaded, pivoting bracket which supports the lower tray of a shopping cart. When a load is placed on the lower tray of the shopping cart. When a load is placed on the lower tray of the shopping cart, the tray pivots down and depresses the spring-loaded bracket, which in turn moves the reflector into line with a light beam and photoelectric cell, thus completing an electrical circuit and activating a signal for the checkout clerk. The use of a single electric eye and a reflector mounted on the cart tray do reduce some of the problems inherent in those systems using an array of light beams to discriminate cart, load, and customer. However, the spring-loaded, pivoting bracket assembly is different and time consuming to install, prone to jamming or wedging, and its placement at the rear of the cart makes the entire system easy to circumvent. The electric eye or reflector may also be blocked by a person's leg, or covered by an unscrupulous customer, and the shiny surface of certain metallic cart frames may cause false signals. A person may also break the reflector off the tray. Furthermore, because the reflector only passes the light beam and electric eye for a brief moment, the signal must be held and displayed until the clerk notices it, and resets the circuit by closing a reset switch.

The shopping cart with lower tray signaling device disclosed in my parent application Ser. No. 06/645,056 presents several advantages over prior designs in that the spring means for elevating the lower tray are positioned adjacent the pivotal axis of the tray near the front of the cart, and no portion of the tray need be vertically disposed over the cart frame at the rear of the cart, so that there is no mechanism to jam, and the tray cannot be wedged in the upright position. Furthermore, the one-piece spring means may be easily manufactured and quickly installed, using a single tool to mount the spring means and reflector on the cart. This system does have some of the same limitations as the previous designs, however, in that the reflector or electric eye may be blocked or obscured by a customer, the electric eye and reflector must be carefully aligned with the light beam, and the system requires resetting.

Therefore, one object of this invention is to design a detection system for loads placed on the lower tray of a shopping cart which does not require aligning a light beam, reflector, and photoelectric cell, which cannot be covered or blocked by a customer, and which is resistant to tampering.

A further object of this invention is to design the above detection system so that it may be easily mounted on existing shopping carts and installed in checkout lines presently in use.

A further object of this invention is to design the above detection system so that in operation it is unobserved by the customer.

Still another object of this invention is to design the above detection system so that it may operate completely automatically, without requiring activation or resetting by the checkout clerk.

U.S. Pat. No. 4,591,175 discloses a shopping cart antitheft apparatus for preventing the removal of shopping carts from the vicinity surrounding a shopping center. The device comprises a locking mechanism which locks the caster wheel of the shopping cart once it is rolled over a magnetic barrier embedded around the perimeter of the shopping center, so that the cart will only travel in circles and cannot be stolen.

Such an apparatus would not function to detect loads placed on the lower tray of a shopping cart, nor provide a signal to the checkout clerk that the load has not been removed from the tray.

In a distinct field of art, U.S. Pat. No. 3,778,808 discloses an electronic weight monitor for use in vehicle weight scales having a spring loaded platform on which increasing loads are placed, and a reed switch which is moved into contact with a magnet once a predetermined amount of weight has been placed on the platform, thus activating the reed switch and closing a signal circuit. While such an electric weight monitor could be installed on the lower tray of a shopping cart, some method of linking the electric circuit on the weight monitor to a signal circuit having a display visible to the clerk at the checkout counter would be necessary. Furthermore, a self-contained voltage supply would be required within the weight monitor on the shopping cart, which would likely require the frequent replacement of batteries or the use of many expensive fuel cells.

BRIEF SUMMARY OF THE INVENTION

The detection system of this invention is characterized by a shopping cart having a lower tray pivotably mounted to move between a first and second position when a load is placed on the tray, a magnetic field producing source attached to the cart which is activated when the tray is moved from the first to the second position, a detector for detecting the presence of that field as the shopping cart passes through the checkout line, and a control circuit capable of signalling the checkout clerk that the load is on the lower tray.

In one embodiment of this invention, the field producing source is a permanent magnetic core normally housed within a shielded receptacle underneath the lower tray of the shopping cart, the core is moved out of the shielded receptacle as the tray is pivoted to the second position, thus activating the field. A detector located in the checkout counter detects the presence of the field, and control circuits display a signal to the checkout clerk, who then looks at the lower tray of the customer's shopping cart.

This system does not require aligning light beams, reflectors, and photoelectric cells. Using a plurality of detectors located in various positions around the checkout line prevents a customer from blocking the detection system with an object which might interrupt the field. Tuning the detectors or the control circuit to respond to a given field corresponding to a predetermined range of distances between the shopping cart and the detector permits the signal to be activated only by the present customer's cart and not others in line, but does not require resetting the control circuit as each customer passes. Each element of the system may be protected from the view of the customer to greatly decrease any opportunity for the customer to compromise the system, and the system may be sealed within a housing to prevent tampering by the customer.

BRIEF DESCRIPTION OF THE DRAWINGS

FIG. 6b is a perspective view of the fastening device for the field emitter and actuator.

FIG. 7 is a rear elevation view of the shopping cart of FIG. 1 between two checkout counters.

FIG. 8 is a circuit diagram of the field detector and signal circuit;

FIG. 9 is a plan view showing the shopping cart between two checkout counters; and FIG. 10 is a plan view of two shopping carts between two checkout counters, with a lower tray in each of the first and second positions.

DESCRIPTION OF THE PREFERRED EMBODIMENTS

Figure 1:
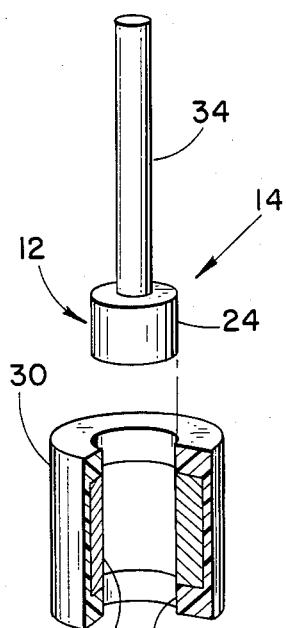
FIG. 1a is a perspective view of the permanent magnet field emitter and the actuator spindle.
FIG. 1b is a cutaway perspective view of the shielding ring and tube.

The detection system for loads on the lower tray of a shopping cart of this invention is shown in FIGS. 1-12 and is referenced generally by the numeral 10.

The detection system 10 consists generally of a field emitter 12, a field actuator 14, a field detector 16, and a signaling circuit 18. The field emitter 12 and the field actuator 14 are mounted on a shopping cart 20, and the field detector 16 and signaling circuit 18 are connected to a checkout counter 22. The shopping cart 20 and checkout counter 22 may be any one of several types currently in widespread use at shopping centers, grocery stores, or supermarkets.

The field emitter 12 should be selected from any number of devices or substance which radiate a field or pseudo-field detectable at a distance d from the emitter 12 itself, and which conforms to a characteristic and uniform wave equation over that distance d in at least two geometric dimensions. The field radiated should not be visible, audible, nor otherwise detectable by the human senses. It should not require an external power source for production. While radioisotopic emitters are feasible, concern over health or safety would mitigate against their use. The field should not be subject to duplication or interference from similar fields, either naturally occurring or produced by emitters commonly encountered in the environment where the detection system 10 will be used. The field should also be capable of passing through limited thicknesses of common building materials such as wood, plastic, or concrete.

In one embodiment of this detection system 10 shown in FIGS. 1-2, a pure magnetic field created by a permanent magnet 24 is used as the field emitter 12. The permanent magnet 24 should produce a magnetic field of magnitude B which may be represented by the magnetic field vector D a distance d from the permanent magnet 24, having a magnetic flux density proportional to the number, and inversely proportional to the spacing, of the lines of induction L produced by that permanent magnet 24.

Figures 3, 4:
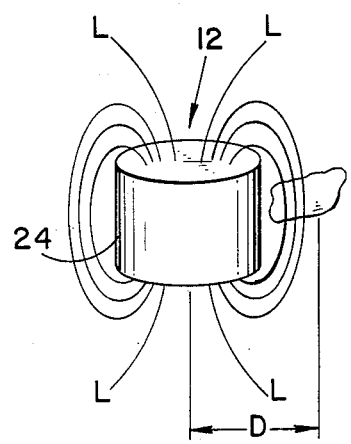
FIG. 3 is a cutaway perspective of the field emitter and field actuator.
FIG. 4 is a diagram representing magnetic lines of induction passing through a nonuniform surface.

Referring to FIG. 4, the number of lines of induction L which pass through a surface S is given by the surface integral:

$$\Phi_B = \int B \cdot \partial S \qquad (1)$$

in which $\Phi_B$ is the magnetic flux.

The field actuator 14 may incorporate any device or substance capable of interrupting, interfering with, or otherwise varying the intensity of the field produced by the field emitter 12 at the distance d from the field emitter 12. For the magnetic field produced by the permanent magnet 24, the field actuator 14 consists of a shielding ring 26 made of a soft iron or other metal having low retentivity for magnetic fields and having a central bore 20 large enough through which to pass the permanent magnet 24. The shielding ring 26 is inset into a housing in the form of a plastic tube 30 having a tube bore 32 ocrresponding to the bore 28 of the shielding ring 26. The permanent magnet 24 is mounted on a spindle 34 which may be used to pass the permanent magnet 24 through the bores 32, 28 in the tube 30 and shielding ring 26 respectively.

The permanent magnet 24 initially emits a given magnetic field. As the permanent magnet 24 is passed into the tube 30 and is surrounded by the shielding ring 26, the magnetic field at a distance d from the field emitter 12 is altered. If the shielding ring 26 is made of a soft iron or a paramagnetic material, the magnetic flux density for the permanent magnet will decrease, and the magnetic flux $\Phi_B$ at a distance d will decrease proportionately. As the permanent magnet 24 emerges from the shielding ring 26, the original magnetic field is restored. It is understood that the shielding ring 26 could also be made from a ferromagnetic material capable of exchange coupling, and the magnetic flux at a distance d might be decreased, increased, or spatially distored in a manner dependent upon the geometric shape and configuration of the shielding ring 26 and the eccenricity of the bore 28 through the shielding ring 26.

The field detector 16 for the field produced by the permanent magnet 24 is a receiving coil 36 made from a length of thin or ultra-fine copper wire coiled in N circular loops having approximately equal radii r so that the receiving coil 36 has a surface area A equaling pi times the radius r squared. As the permanent magnet 24 is moved past the receiving coil 36, an electric current i with a voltage or electromotive force $\epsilon$ is induced in the receiving coil 36. The magnitude of the electromotive force is proportional to the time rate of change of the magnetic flux $\Phi_B$ across the surface area A of the loops of the receiving coil 16, represented by Faraday's law of induction:

$$\epsilon_o = \partial \Phi_B / \partial \tau \qquad (2)$$

which may be rewritten for a receiving coil 16 having having N loops as:

$$\epsilon_o = N(\partial \Phi_B / \partial \tau) = \partial(N\Phi_B)/\partial \tau \qquad (3)$$

wherein $N\Phi_B$ is referred to as the flux linkage and $\tau$ is time.

Referring to the schematic diagram of FIG. 8, the induced current i in the receiving coil 16 is electrically coupled to the signaling circuit 18. The signaling circuit 18 consists of an amplifier 38 which amplifies the magnitude of the induced electromotive force $\epsilon_1$ to a value $\epsilon_a$ many times greater than $\epsilon_1$, a Schmidt trigger 40 or other similar logic circuit, and a holding circuit 42 which activates a visual display such as a signal lamp 44 responsive to a specified logical output from the Schmidt trigger 42. The holding circuit 42 may alternately be used to activate a buzzer 46 which may be disconnected from the signaling circuit 18 by a switch 48.

Figure 5:
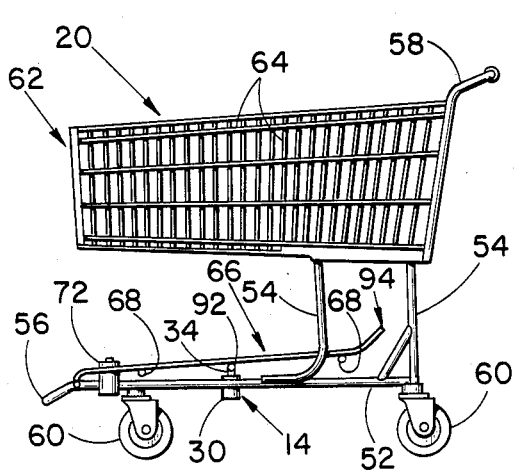
FIG. 5 is a side elevation view of a shopping cart equipped with the improved signal emitting apparatus.
Figure 6A:
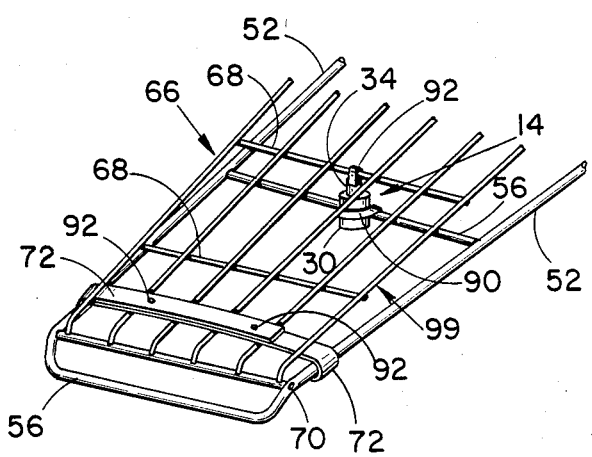
FIG. 6a is a perspective view of the lower tray of the shopping cart of FIG. 5.

The shopping cart 20 shown in FIGS. 5 and 7 has a frame 50 including bottom frame members 52, generally vertical frame members 54 extending upward from the bottom frame members 52, and cross brace members 56 extending between the bottom frame members 52. A handle 58 is provided for pushing the shopping cart 20, and four caster wheels 60 support the frame 50 for moving the shopping cart 20. An upper basket 62 constructed from a plurality of horizontally and vertically spaced wire members 64 is mounted on the frame 50. A lower tray 66 comprised of crossed wire members 68 is pivotably mounted on the frame 50 beneath the basket 62 and between the bottom frame members 52. The lower tray 66, as shown in FIG. 6, is supported by one of the cross brace members 56 when it is pushed downward, and pivots upward from its horizontal pivotal axis 70 near the front of the shopping cart 20. Axis 70 is defined by front, transverse wire member 68 which is pivotally secured at its opposite ends to bottom frame members 52. The tray 66 is held above the cross brace members 56 by a set of interconnected leaf springs 72 laced between the crossed wire members 68 and connected to the bottom frame members 52.

Referring to FIGS. 9 and 10, a plurality of checkout counters 22 are each spaced apart a distance W to form aisles 74 therebetween, each aisle 74 being wide enough to accommodate a shopping cart 20. Each checkout counter 22 is generally equipped with a cash register 76, one or two conveyor belts 78, a gate 80 and divider 82, and a skew reader 84 inset in a checkout platform 86.

The field detector 16, preferably in the form of receiving coil 36, is mounted within the checkout counter 22 adjacent the aisle 74, and below the checkout platform 86 at a height h between the lower tray 66 of a shopping cart 20 and the floor 88 of the aisle 74, as shown in FIG. 7. The signaling circuit 18 is mounted within the checkout counter 22 or cash register 76, with the signal lamp 44 being placed next to or within the cash register 76 and visible to a checkout clerk.

The field emitter 12 and field actuator 14 are mounted on the shopping cart 20, as shown in FIGS. 5-7. The tube 30 of the field actuator 14 may be fastened to one of the cross brace members 56 of the frame 50 using a fastener 90 such as a bracket or clamp. The top end of the spindle 34 is attached to one of the crossed wire members 68 of the lower tray 66 using an appropriate fastening device. A hanger clamp 92 of the pipe hanger type may be mounted over the top of one of the cross members 68, with its free, depending ends embracing the opposite sides of spindle or rod 34. A transverse hole in spindle 34 receives a threaded fastener 93 to secure clamp 92 to the upper end of spindle 34. Because stacking shopping carts 20 are common, the field actuator 14 should be mounted so that the lower edge of the tube 30 does not extend below the cross brace member 56 of the frame 50 so that it will not interfere with or be damaged by another shopping cart 20 which is stacked within that cart 20.

Figure 2A:
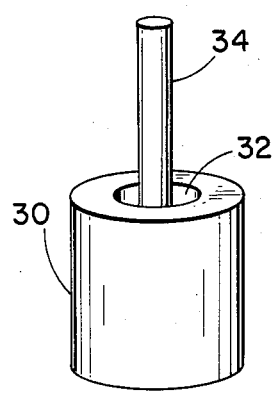
FIG. 2a is a perspective view of the field emitter and field actuator in the first position.
Figure 2B:
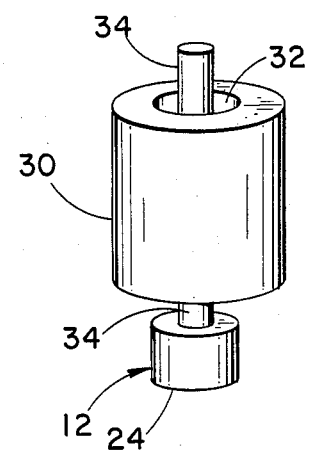
FIG. 2b is a perspective of the field emitter and field actuator in the second position.

The tube 30 and spindle 34 should be positioned so that when the lower tray 66 is in a first, upward position 94 supported by the leaf springs 72, the permanent magnet 24 will be positioned within the bore 28 of the shielding ring 26 and surrounded by the shielding ring 26, as shown in FIG. 2a. When the lower tray 66 is pushed downward to a second position 96 wherein the lower tray 66 is supported by the cross brace member 56, the permanent magnet 24 is positioned outside and below the shielding ring 26, as shown in FIG. 2b. The tube 30 may be made long enough to cover the permanent magnet 24 and spindle 34 when they are in the second position, and sealed to thereby act as a tamper-proof housing for the entire field actuator 14, as shown in FIG. 3. Although the permanent magnet 24 may emit a substantially constant magnetic field at all times, the relative condition in which the permanent magnet 24 is outside the shielding ring 26 may be termed actuating the field at a distance d, while the relative condition in which the permanent magnet 24 is inside the shielding ring 26 may be termed deactuating the field at a distance d.

In operation, a customer pushes the shopping cart 20 around the store and collects a load of items 98 which are placed in the basket 62 or on the lower tray 66 of the shopping cart 20. When the customer has completed shopping, the shopping cart 20 is wheeled to the checkout counters 22, and through the aisle 74 adjacent a counter 22 with an available clerk. The customer removes the items 98 from the shopping cart 20 and places them on the checkout platform 86 whereby the clerk may then total the amount owed by the customer for those items 98 and place them on the conveyor belt 78 to be carried to the end of the checkout counter 22 where another clerk or the customer may bag the items 22.

If the customer has not placed an item on the lower tray 66, the lower tray will remain supported in the first position 94, and the permanent magnet 24 will be surrounded by the shielding ring 26. As the shopping cart 20 is rolled past the receiving coil 36 of the field detector 16, a small electromotive force $\epsilon_1$ will be induced in the receiving coil 36. This electromotive force $\epsilon_1$ will be amplified by the amplifier 38, and the signaling circuit 18 will identify this amplified electromotive force $\epsilon_a$ as corresponding to a field emitter 12 and lower tray 66 in the first position 94, not containing an item 98. The signal circuit 18 will not register a signal.

If the customer has placed an item 98 on the lower tray 66, the lower tray 66 will be held in the second position 96 by the weight of the item 98, and the spindle 34 will be depressed by the lower tray 66 so that the permanent magnet 24 will no longer be surrounded by the shielding ring 26. As the shopping cart 20 is rolled past the receiving coil 36 of the field detector 16, a distinct electromotive force will be induced in the receiving coil 36. This electromotive force $\epsilon_1$ will be amplified by the amplifier 38, and the signaling circuit 18 will identify this amplified electromotive force $\epsilon_a$ as corresponding to a field emitter 12 and lower tray 66 in the second position 96, containing an item 98. The signaling circuit 18 will register a signal by activating the lamp 44. When the item 98 is removed from the lower tray 66, the lower tray 66 will pivot back to the first position 94, and the permanent magnet 24 will move upward within the shielding ring 26. The movement of the permanent magnet 24 to the first position 94 will accordingly induce a distinct electromotive force $\epsilon_1$ in the receiving coil 36, which will be amplified and identified by the signaling circuit 18 as an item being removed from the lower tray 66, and the signaling circuit may terminate the registered signal by deactivating the signal lamp 44. If the customer does not remove the item 98 from the lower tray 66, the signal lamp 44 will remain activated so the clerk may remind the customer of the item 98. If the clerk does not respond to the signal lamp 44 for some reason, and the customer proceeds to continue thrsough the aisle 74 with the shopping cart 20 containing the item 98 on the lower tray 66, a distinct electromotive force $\epsilon_1$ will be induced in the receiving coil 36, amplified and identified by the signaling circuit 18, which may then register a second signal to the clerk, such as by activating the buzzer 46.

This process of detecting magnetic fields by identifying distinct induced electromotive forces may be further modified to distinguish other conditions. Several field detectors 18 may be placed at various points along the checkout counter 22 so that a customer cannot easily block the field detectors 16 in order to cause the signaling circuits 18 to register inaccurate results. As shown in FIG. 10, two field detectors 16 may be positioned so that both field detectors 16 must detect the field in order to cause the signaling circuit 18 to register. Consequently, a shopping cart 20 with an item 98 on its lower tray 66 may be wheeled into the aisle 74 behind the customer's shopping cart 20 without causing a false signal to be registered for the first customer. The permanent magnet 24 may also be fashioned in a particular geometric shape to spatially distort the magnetic field so that the electromotive forces induced as the shopping cart 20 is wheeled into the aisle 74 is different than the electromotive forces induced as a shopping cart 20 is wheeled out of the aisle 74, and to limit any variations in the induced electromotive forces that might result as the speed of the shopping cart 20 is varied. The signaling circuit 18 may also be designed to discriminate between different directions of movement in the shopping cart 20 based upon the sign or direction of the induced electromotive force $\epsilon_1$. The spatial relationship of the permanent magnet 24 and the shielding ring 26 in the first and second positions 94, 96 may be reversed, although this would present a more complicated problem of detection when the detection system 10 is used in the environment and for the purpose described, so that the signaling circuit 18 would register a deactuation rather than an acutation of the field at a distance d from the receiving coil 16 within the range of distances that the field emitter 12 might possibly be located away from the receiving coil 36 as the shopping cart 20 is wheeled through the aisle 74.

The signal lamp 44 may be incorporated into the display of the cash register 76 so it will not be noticeable to the customer. Also, as shown in FIG. 3, the leaf springs 72 on the lower tray 66 may be replaced by a coil type compression spring 100 connected directly to the tube 30 and spindle 34, further concealing the function of the detection system 10.

Figure 11:
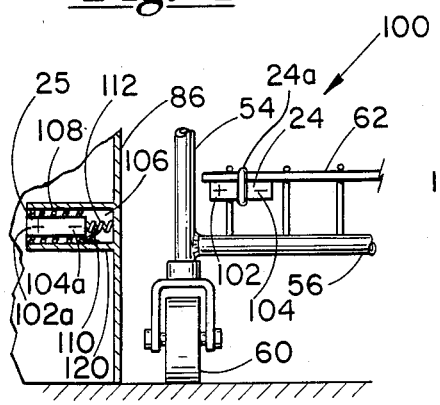
FIG. 11 is a rear view showing use of a bar magnet.

In a different embodiment of this invention, referenced generally by the numeral 100 and shown in FIGS. 11 and 12, a bar-type permanent magnet 24a is used as the field emitter 12. The bar-type magnet 24a has a north pole 102 designated (+) and south pole 104 designated (−), each pole 102, 104 being at opposite ends of the bar-type magnet 24a. Referring to FIG. 11, the bar-type magnet 24a is mounted to the lower tray 66 such that a line from the north pole 102 to the south pole 104 would be generally perpendicular to the bottom frame members 52 and parallel to the cross brace members 56 of the shopping cart 20.

In this embodiment of the detection system 10, the bar-type magnet 24a would not be sheathed in a protective tube 30, nor would it be surrounded by a shielding ring 26. Instead, the field detector 16 would use physical means to detect the magnetic field. One such physical detection means would consist of a similar bar-type magnet 25, with a north pole 102a and a south pole 104a, slidably mounted within a channel 106 behind the checkout counter 22 and oriented parallel to the bar-type magnet 24a attached to the shopping cart 20.

As the bar-type magnet 24a mounted on the shopping cart 20 passes the bar-type magnet 25 slidably mounted in the channel 106, the magnets 24a, 25 will exert a force upon each other causing the magnet 25 in the field detector 16 to move in the channel 106 either toward or away from the magnet 24a on the shopping cart 20. The magnet 25 in the field detector 16 will move toward the magnet 24a on the shopping cart 20 if the sign of the pole of the magnet 25 in the field detector 16 is opposite to the sign of the nearest pole of the magnet 24a on the shopping cart 20, and the magnet 25 in the field detector 16 will move away from the magnet 24a on the shopping cart 20 if the sign of the pole of the magnet 24a in the field detector 16 is the same as the sign of the nearest pole of the magnet 24a on the shopping cart 20.

The magnet 25 and channel 106 may be surrounded by an induction coil 108 so that as the magnet 24a in the field detector 16 moves, it sets up an induced current i in the coil 108 which activates a signaling circuit 18 as detailed above. The movement of the magnet 25 in the field detector 16 may also be used to close or open a mechanical switch 110 within the channel 106, which in turn would be connected to the signal circuit 18. A spring 112 connected to one end of the magnet 25 in the field detector 16 opposing the force exerted by the magnet 24a on the shopping cart 20 would move the magnet 25 in the field detector 16 back to its original position after the magnet 24a on the shopping cart 20 has passed by, thus resetting the field detector 16.

Referring to FIG. 12, the field detector 16 might also consist of a magnetic armature 114 having a north pole 102b and a south pole 104b, the armature 114 being pivotably mounted on a relatively frictionless axle 116 so that it may rotate freely when subjected to a slight magnetic force, similar to the operation of a compass. As the bar-type magnet 24a mounted on the shopping cart 20 passes the armature 114, the magnet 24a will exert a force upon the armature 114 causing it to rotate so that the pole of the armature 102b, 104b having a sign opposite to the sign of the nearest pole of the magnet 102, 104 will be as close to the magnet 24a as possible. This rotation of the armature 114 in the field detector 16 may be used to close or open a switch (not shown) which in turn would be connected to the signal circuit 18.

A coil-type spring (not shown) may be connected to the armature 114 or axle 116 to oppose the force exerted by the magnet 24a on the armature 114. The spring would rotate the armature 114 in the field detector 16 back to its original position after the magnet 24a on the shopping cart 20 has passed by, thus resetting the field detector 16. Instead of employing a spring, a very small and relatively weak magnet 118 could be placed adjacent the armature 118 on the side opposite to the bar-type magnet 24a on the shopping cart, the polarity of the small magnet 118 being opposite to the polarity of the magnet 24a on the shopping cart 20. Thus, in the absence of the magnetic field generated by the magnet 24a attached to the shopping cart 20, the small magnet 118 in the field detector would rotate the armature 114 to a position opposite in orientation to the position of the armature 114 in the presence of the magnetic field generated by the magnet 24a on the shopping cart 20. As the magnet 24a on the shopping cart 20 passed the field detector 16, the force created by the relatively strong magnetic field generated by the bar-type magnet 24a on the shopping cart 20 would exceed the relatively weak force created by the weaker magnetic field generated by the small magnet 24a in the field detector 16, and the armature 114 would rotate to close or open the pressure switch 108. Once the bar-type magnet 24a on the shopping cart 20 passes by, the magnetic field generated by the weaker magnet 118 will rotate the armature 114 back to its original position.

To ensure that the field detector 16 may readily detect a shopping cart 20 with an item 98 on the lower tray 66, the bar-type magnet 24a mounted on the lower tray 66 should have a cylindrical or rectangular configuration, with the pole ends of the magnet 102, 104 being flat rather than rounded. Because the lines of flux of a magnetic field are perpendicular to the surface of the magnet from which they emanate, the flat ends 102, 104 of the bar magnet 24a will create a narrow envelope of flux lines extending from each end of the magnet 24a and generally parallel to the orientation of the magnet 24a. Thus, the field detector 16 may be placed at a height h above the floor 88 equal to the height h of the envelope of flux lines emanating from the bar-type magnet 24a when the lower tray 66 is in the second position 96. As shown in FIG. 11, it would be possible to place a layer of a shielding substance 120 similar to the shielding ring 26 above and below the field detector 16 so that the strength of the magnetic field reaching the field detector 16 would only be great enough to slidably move the magnet 25 in the channel 106, or rotate the armature 114, when the magnet 24a on the lower tray 66 is in the second position 96.

An additional way to ensure that the field detector 16 may distinguish between a shopping cart 20 with an item 98 on the lower tray 66 is to suspend the bar-type magnet 24a from the lower tray 66 on a bracket 122, as shown in FIG. 12, so that when the tray 66 is in the first position 94 with no item 98 on the tray 66, the envelope of flux lines emanating from the flat end of the bar-type magnet 24a on the lower tray 66 will be shielded or blocked by the bottom frame members 52 of the shopping cart frame 50. A portion of the bottom frame member 52 may be made from a material particularly suited for blocking the magnetic field, or an additional shielding layer (not shown) may be attached to the bottom frame member 52 adjacent the bar-type magnet 24a.

In these embodiments of the detection system 10, the act of displacing the bar magnet 24 mounted on the tray 66 to a position wherein the envelope of flux lines in the magnetic field are sufficiently strong to effect the field detector 16 and induce any physical movement within the field detector 16 necessary to produce a signal, may be termed actuating the field emmitter 12.

What is claimed is:

1. On a shopping cart having a frame and a tray, said tray being movable between a first position and a second position when a load is placed on said tray, the improvement being a detector system comprising:
   a field producing source carried on the cart and generating a field detectable at a predetermined distance;
   actuation means on the cart for selectively actuating said field at said distance responsive to movement of the tray from the first to the second position;
   detection means for detecting said field at said distance; and
   signaling means for signaling the detection of said field by said detection means.

2. On a shopping cart having a frame and a tray, said tray being movable between a first position and second position when a load is placed on said tray, the improvement being a detector system comprising:
   a field producing source carried on the cart and generating a field detectable within a range of distances;
   actuation means on the cart for selectively actuating said field within said range of distances responsive to movement of the tray from the first to the second position;
   detection means for detecting said field within said range of distances; and
   signaling means for signaling the detection of said field by said detection means.

3. In a cart having a frame and a tray to support a load, the improvement being a detector system comprising:
   a field producing source carried on said cart and generating a field detectable at a predetermined distance;
   actuation means on the cart for selectively actuating said field at said distance responsive to placement of the load on the tray;
   detection means for detecting said field at said distance; and
   signaling means for signaling the detection of said field by said detection means.

4. In a cart having a frame and a tray to support a load, the improvement being a detector system comprising:
   a field producing source on the cart for generating a field detectable within a range of distances;
   actuation means for selectively actuating said field within said range of distances responsive to placement of the load on the tray;
   detection means for detecting said field within said range of distances; and
   signaling means for signaling the detection of said field by said detection means.

5. The detection systems of claim 1, 2, 3, or 4 wherein the field is induced by a permanent magnet, said permanent magnet normally being mounted within a shield for relative displacement movement between said shield and said magnet, said actuating means comprising means to spatially displace said permanent magnet and said shield relative to each other to thereby expose said permanent magnet and the field generated to the detection means.

6. The detection system of claim 1, 2, 3, or 4 wherein the shopping cart moves along a path through a checkout line, and the detection means comprises a plurality of detectors locatable at positions displaced within said checkout line proximate to said path of the shopping cart.

7. The detection system of claim 5 wherein:
   the detection means includes a receiving coil in which an electromotive force is induced responsive to detection of the field; and
   said signaling means includes a control circuit electrically connected to said receiving coil, said control circuit having an amplifier for amplifying the electromotive force induced by said receiving coil, a logic circuit electrically connected to receive a current induced in said receiving coil by said electromotive force, a holding circuit electrically connected to and operated by said logic circuit, and a visual or audible display connected to and activated by said control circuit.

8. The detection system of claim 1 wherein said field producing source is a permanent magnet normally contained within a shielding housing, said magnet and said housing being movably displaceable with respect to each other; and
   said actuation means is mechanically connected between said tray and said magnet and is constructed and arranged to displace said magnet from said shielding housing in response to the movement of said tray from said first to said second position.

9. The detection system of claim 8 wherein said tray is the lower tray on a shopping cart and is pivotally connected to said frame at one end thereof for downward pivotal movement from said first position to said second position in response to the placement of a load on said tray.

10. The detection system of claim 9 wherein said actuation means comprises an elongated spindle member connected between said tray and said magnet.

11. The detection system of claim 8 wherein said shielding housing is of elongated tubular shape and includes a shielding ring normally embracing said magnet in blocking relation to the magnetic field generated by said magnet.

* * * * *

UNITED STATES PATENT AND TRADEMARK OFFICE
CERTIFICATE OF CORRECTION

PATENT NO. : 4,723,118

DATED : February 2, 1988

INVENTOR(S) : Charles M. Hooley and Patrick J. Utecht

It is certified that error appears in the above-identified patent and that said Letters Patent is hereby corrected as shown below:

In column 2, line 14 of the specification, the sentence "When a load is placed on the lower tray of the shopping cart." should be deleted.

In column 2, line 24, change "different" after "assembly is" to --difficult--.

In column 4 under the BRIEF DESCRIPTION OF THE DRAWINGS add:

--FIG. 12 is a rear elevation showing one embodiment of the detection system.--

In column 5, line 2, change "vector D" to --vector B--.

In column 5, line 22, change "bore 20" to --bore 28--.

In column 5, line 44, change "distored" to --distorted--.

UNITED STATES PATENT AND TRADEMARK OFFICE
CERTIFICATE OF CORRECTION

PATENT NO. : 4,723,118

DATED : February 2, 1988

INVENTOR(S) : Charles M. Hooley and Patrick J. Utecht

It is certified that error appears in the above-identified patent and that said Letters Patent is hereby corrected as shown below:

In column 7, line 61, change "distinet" to --distinct--.

Signed and Sealed this

Eleventh Day of June, 1991

*Attest:*

HARRY F. MANBECK, JR.

*Attesting Officer*

*Commissioner of Patents and Trademarks*